Patented Sept. 6, 1949

2,481,140

UNITED STATES PATENT OFFICE 2,481,140

PROCESS AND PRODUCTS OF SULFURIZATION OF LINEAR METHYLPENTADIENE POLYMERS

Rupert C. Morris, Berkeley, and John L. Van Winkle, San Lorenzo, Calif., assignors to Shell Development Company, San Francisco, Calif., a corporation of Delaware No Drawing. Application September 16, 1946, Serial No. 697,376

8 Claims. (Cl. 260—139)

This invention relates to a process for the sulfurization of low molecular weight linear polymers of the methylpentadienes and to the products thereof.

Processes for the sulfurization of hydrocarbon polymers have been known for some time. Such processes, however, are directed to the sulfurization of high molecular weight cyclic polymers and when they are used to sulfurize low molecular weight polymers little if any sulfurization occurs. Even when the conditions of the known processes are varied, such as elevating the temperature, the sulfurization of low molecular weight polymers (e. g. tetrameric isobutylene) cannot be accomplished without rapid degradation of the polymer.

It has been discovered, however, that members of a particular group of the low molecular weight polymers, i. e. the low molecular weight linear polymers of the methylpentadienes, act differently from the other low molecular weight polymers and have an inherent property within their structure that enables them to be sulfurized at the elevated temperatures without the expected degradation of the polymer. It has also been found that the resulting sulfurized polymers of the methylpentadienes have unique properties which enable them to be used for a great many beneficial purposes more fully described hereinafter.

It is an object of the present invention, therefore, to provide a method for the sulfurization of low molecular weight linear polymers of methylpentadienes. It is a further object of the invention to provide a new class of materials which possesses many advantageous properties making the products useful in a great many industrial applications. Other objects and advantages of the invention will be apparent from the following detailed description thereof.

Molecular weights of polymers of the type coming within the scope of the present invention are usually described in comparison to the molecular weight of natural rubber. Rubber-like polymers having a molecular weight in the vicinity of the molecular weight of natural rubber, i. e. around 50,000 to 300,000, are termed high molecular weight polymers. Polymers having a molecular weight in the vicinity of 10,000 or less are termed low molecular weight polymers. By the term "low molecular weight polymer," as employed throughout the specification and appended claims, is meant those polymers having a molecular weight of approximately 5,000 or less.

By the term "linear polymer," as employed throughout the specification and appended claims, is meant those polymers possessing a structure wherein the molecules of the reactant or reactants are joined together in an open-chain type structure. Such linear type polymers are readily distinguished from the closed, cyclic structures of other polymers by means of infra-red analysis.

The methylpentadienes with which the invention is concerned are branch-chain 1,3-hexadienes having a straight chain of 5 carbon atoms, specifically, 2-methyl-1,3-pentadiene, 3-methyl-1,3-pentadiene, 4-methyl-1,3-pentadiene.

The above-described low molecular weight linear polymers of the methylpentadienes which are sulfurized in accordance with the invention may be produced by any suitable method. They may be produced, for example, by subjecting the methylpentadienes to an elevated temperature in a sealed tube for an extended period of time. They also may be produced by treating the monomer with a concentrated acid such as sulfuric acid, or by subjecting the methylpentadienes to the action of a polymerizing catalyst. The more preferred method is a variation of the procedure described in the co-pending application Serial No. 534,342, filed May 5, 1944, for the production of high molecular weight linear polymers of the methylpentadienes. By this preferred method the polymerization is accomplished by dissolving the methylpentadiene or methylpentadienes in a diluent and then treating the resulting solution with a Friedel-Crafts type catalyst at an elevated temperature.

In the production of the polymers by the preferred method, any of the above-described methylpentadienes may be employed. A single methylpentadiene can be polymerized alone or two or more methylpentadienes can be polymerized in admixture with one another. It is preferred to employ a mixture of 2-methyl-1,3-pentadiene and 4-methyl-1,3-pentadiene, e. g. a mixture of about 85% of 2-methyl-1,3-pentadiene with about 15% of 4-methyl-1,3-pentadiene, such as may be produced by the dehydration of 2-methyl-2,4-pentanediol. In general, polymerization inhibitors such as tert.-butyl catechol and others, which may be present in the monomer, need not be removed. The polymerization occurs in accordance with the preferred method in the presence of such inhibitors.

Any inert diluent, with the exception of the olefinic hydrocarbons, may be used to dissolve the methylpentadienes in the preferred method of polymerization. The olefinic hydrocarbons are undesirable as they tend to form complexes with the metallic halide catalysts or cause the formation of polymers having a much higher molecular weight than that desired in the present process. Preferred diluents are liquids which are solvents for both monomer and polymer under the conditions involved. The paraffin hydrocarbons are particularly useful as diluents for the polymerization process. Examples of suitable solvents are ethane, propane, the butanes, the pentanes, octane, methyl chloride, ethyl chloride and propyl chloride, and mixtures thereof. Aromatic compounds should usually be avoided because of the danger of alkylation thereof.

The amount of the catalyst to be used in the polymerization reaction will depend upon the particular catalyst and diluent being added to the reaction and the particular methylpentadiene or mixtures of methylpentadienes being polymerized. In all cases, however, the reaction goes almost to completion with the addition of only a very small amount of catalyst. In general, amounts as small as about 0.2 part of catalyst per 100 parts of the methylpentadienes are satisfactory, although where traces of moisture are present in the reaction mixture somewhat larger amounts, e. g. 0.75 part of catalyst per 100 parts of the methylpentadienes, may be required. The rate of polymerization and the conversion of the monomer to polymer increases with increasing amounts of catalyst, at least up to about 4 parts of catalyst per 100 parts of the methylpentadienes, beyond which an increase in catalyst may not appreciably increase the rate of polymerization. Amounts as large and larger than 5 parts of catalyst per 100 parts of the methylpentadienes have been used.

For the production of the desired low molecular weight linear polymers the polymerization process should be conducted at temperatures above 0° C. The upper limit for the temperature range of the polymerization should not be substantially above 100° C. The addition of the Friedel-Crafts catalyst to the methylpentadiene solution results in an exothermic reaction which usually furnishes sufficient heat to carry the polymerization to completion without the addition of any external heat. External heat may be applied when desired or necessary but in some cases, however, cooling of the reaction mixture may be necessary. The exact temperature in each case depends upon the particular reactants and especially upon the type of diluent used. The polymerization reactions carried on in a pentane solution, for example, proceed at around 35° C. while those reactions carried on in an octane solution proceed at around 100° C.

The polymerization is preferably carried out in the liquid phase under atmospheric pressures. However, subatmospheric or superatmospheric pressures may be employed if desired or necessary.

The ratio of the diluent to the methylpentadienes may be varied over a wide range. Amounts as small as about 10 parts of diluent per 100 parts of the methylpentadienes are effective. Mixtures within the range of about 70 parts to about 500 parts of diluent per 100 parts of the methylpentadienes are preferred. Much higher ratios, e. g. as high as 1,000 parts of diluent per 100 parts of the methylpentadienes can be employed.

Substantially any Friedel-Crafts catalyst may be employed which is soluble in the methylpentadienes or which can be added as a solution in an inert solvent which is also a solvent for the methylpentadienes. By the term "Friedel-Crafts catalyst" is meant any catalyst capable of being used for the Friedel-Crafts type condensation. Examples of Friedel-Crafts catalyst are hydrolyzable metallic halides such as stannic chloride, aluminum chloride, zinc chloride, ferric chloride, titanium tetrachloride, antimony pentachloride, and boron trifluoride. The catalyst should usually be in substantially anhydrous condition and is preferably of a high degree of purity.

To promote a smoother reaction it is sometimes preferred to dissolve the catalyst in an inert liquid before adding it to the reaction mixture. When the catalyst is added without a solvent immediate local polymerization may occur in the region about the added catalyst, preventing the uniform admixture of the catalyst with the methylpentadiene and resulting in an inhomogeneous product. Methyl chloride, ethyl chloride and 2,4-dimethyl-sulfolane are solvents which may be used to dissolve the catalyst. The boron trifluoride is particularly more active as a catalyst for the polymerization of the methylpentadienes when it is dissolved in ethyl ether with which it forms an active boron fluoride-ethyl ether complex. The ethyl chloride solutions of aluminum chloride and stannic chloride and the boron trifluoride-ethyl ether complex are the more preferred catalysts for the polymerization of the methylpentadienes.

The polymerization may be carried out in any suitable vessel which permits the addition of the catalyst and the stirring and refluxing of the reactants. In some cases it may be advisable to spray the catalytic solution over the methylpentadiene mixture, instead of adding it portionwise, in order to induce a smoother reaction. The reaction mixture may be blanketed with air, nitrogen, carbon dioxide or other fluid, as desired. The polymerization may be carried out in a continuous or batchwise manner.

The time required for the reaction is dependent upon many factors including the nature and the properties of the ingredients of the reaction mixture, the conditions under which the reaction is conducted and the degree of completion desired. In the higher temperature range and with substantial amounts of catalyst a 90% conversion of monomer to polymer may be obtained in 2 hours. Under other conditions 24 hours or more may be required to obtain a high percentage of conversion.

Upon completion of the reaction the polymer is separated from the reaction mixture, which will generally include the catalyst, diluent and a small amount of the unreacted methylpentadiene by any suitable means comprising such steps as, for example, solvent extraction, washing, filtration and the like.

The products resulting from the hereinabove-described polymerization process are thick, oily linear polymers having a molecular weight from about 400 to about 5,000. The specific molecular weight of the polymers depends upon the particular diluent and particular catalyst used in the polymerization process. The use of the boron trifluoride-ethyl ether complex with isopentane as the solvent, for example, gives light colored thick oils with a molecular weight of about 720. When aluminum trichloride is used with isopentane as the solvent the polymer is a clear, thick, oily material with a molecular weight of about 1720. Higher or lower molecular weights than the above described may be obtained by merely varying the reactants. Polymers having a molecular weight of about 492 can be obtained, for example, by using the boron trifluoride-ethyl ether complex with an isopentane solution of a methylpentadiene that had not been previously flash distilled from a 10% sodium hydroxide solution. The use of aluminum trichloride with a butane solution in the polymerization reaction produces methylpentadiene polymers having a molecular weight as high as 3,000.

Infra-red ray analysis of the low molecular weight polymers of methyl pentadienes indicates that the polymers have a linear type structure. Iodine determinations indicate that the polymers also possess a double bond for each methylpentadiene molecule within the structure. The polymers are thus probably products of principally 1,4-polymerization, 1,2-polymerization. Substantially no 1,3-polymerization occurs. In accordance with the above analysis the polymer resulting from the addition of the boron trifluoride-ethyl ether complex to a mixture of 2-methyl-1,3-pentadiene and 4-methyl-1,3-pentadiene dissolved in isopentane may be described as a light colored oil having the structure of 9 units of the methylpentadienes joined in a linear type structure and possessing one double bond per methylpentadiene molecule.

Molecular weight determinations referred to in this application were made in accordance with the procedure described by E. J. Nair in the Bureau of Standards Journal of Research 14, 345 (1935).

The sulfurization of the low molecular weight linear polymers of the methylpentadienes may be effected in any suitable manner. The process consists essentially in the reaction of sulfur with the polymers at an elevated temperature to give products containing chemically combined sulfur. The products appear to be definite compounds, although the nature of the reaction involved and the exact identity of the compounds formed are not entirely understood.

The amount of the sulfur to be combined with the methylpentadiene polymers will vary up to approximately 25% by weight of the combined amount of sulfur and the methylpentadiene polymer, depending upon the degree of sulfurization desired. Amounts of sulfur greater than approximately 25% by weight are unable to be chemically combined with the polymers under the conditions of the process of the invention and, therefore, should be avoided. Amounts of sulfur as small as 0.5% by weight may be employed. The preferred amount of sulfur to be combined with the polymer will vary between about 5% and 15% by weight of the combined amount of sulfur and the methylpentadiene polymer being sulfurized.

The desired total amount of sulfur may be added all at once or portions may be added at intervals. The sulfur may be added before or after the methylpentadiene polymer has been brought to the desired temperature. After the sulfur has been added to the polymer the mixture may be then maintained, preferably with stirring or other methods of agitation, under the required conditions of heat and pressure.

Slow sulfurization begins at temperatures as low as about 150° C. Temperatures within the range of from about 160° C. to about 200° C. may be employed under practical conditions. The more narrow range of from 160° C. to about 170° C. is preferred. When the reaction is carried out in accordance with the invention, no appreciable amount of hydrogen sulfide is evolved.

The sulfurization is preferably carried out in the liquid phase or at least under such conditions that a liquid phase is maintained in the reaction zone. Atmospheric pressures are ordinarily satisfactory, although superatmospheric pressures or reduced pressures may be employed.

Oxygen and oxygen-yielding substances are preferably excluded from the reaction mixture. There is preferably provided for the mixture a blanket of an oxygen-free fluid such as oxygen-free nitrogen, carbon dioxide, etc. The sulfurization reaction may be carried out in a continuous or discontinuous manner. It may be effected in the presence or absence of a homogenizing substance, preferably a substance which is non-reactive and liquid under the reaction conditions employed and which is a solvent for both the sulfur and the methylpentadiene polymers. If desired, sulfurization may be carried out on the methylpentadiene polymer in situ in its intended use. For example, where the sulfurized polymer is to be employed as a hydrocarbon lubricating oil additive, the unsulfurized polymer may be first dissolved in the oil and there subjected to sulfurization in accordance with the invention.

The duration of the sulfurization treatment is dependent principally upon the relative proportions of polymer and sulfur employed, the reaction conditions including the particular temperatures and pressures involved, and the degree of sulfurization desired. Satisfactory products may be produced in some cases even after 1 or 2 hours' treatment. In other cases the treatment requires 4 or 5 hours. Improved products having greater stability and homogeneity may be obtained by heating in accordance with the invention for from about 10 to about 30 hours.

Following sulfurization the products may be separated from any other remaining ingredients of the reaction mixture and further purified in any suitable known or special manner. Inert diluents, if present, may be removed by distillation, by solvent extraction, or the like. Excesses of sulfur may separate out on cooling of the reaction mixture and may be removed therefrom by filtration or the like. Remaining sulfur may be separated by taking up the product in a suitable solvent, such as an aliphatic hydrocarbon, e. g. isopentane, isooctane, etc., or other suitable solvents, followed by recovery in the usual manner. However, where not more than about 15% of sulfur based on the combined amount of sulfur and methylpentadiene polymer has been added and the mixture has been treated for 5 hours or more, all of the added sulfur will ordinarily have reacted and no purification or recovery procedures need be taken, provided inert diluents, etc. are not present.

The products of sulfurization in accordance with the process of the invention consist essentially of low molecular weight linear polymers of the methylpentadiene, which polymers contain chemically combined sulfur. Polymers of improved properties can be produced which contain only a very small amount, e. g. about 0.5%, of combined sulfur. Preferred polymers contain from about 5% to about 15% of combined sulfur based on the combined amount of sulfur and methylpentadiene polymer. Other polymers in accordance with the invention containing up to 25% or even somewhat more combined sulfur, while useful for many purposes, are of reduced general value because they may tend to lose sulfur at elevated temperatures.

The methylpentadiene polymers containing amounts of sulfur up to about 15% of combined sulfur are particularly valuable as additives for lubricating oils to be used at elevated temperatures as the sulfur is firmly held within the polymer and will not be liberated at the high temperatures to corrode the lubricated parts.

The preferred sulfurized polymers as well as the other sulfurized products coming within the scope of the invention are valuable ingredients in all kinds of vulcanizable compositions. They are particularly valuable in rubber-like compositions, such as those containing natural rubber, reclaimed rubber, synthetic rubber, or mixtures of these with one another and with other substances. The sulfurized polymers act not only as plasticizers and tackifiers but also have been found to act as vulcanization accelerators, decreasing the time required for vulcanization. They also may be employed with synthetic rubber such as the rubbery polymers and copolymers of 1,3-butadiene. Compounds which may be copolymerized with these and other dienes include styrene, dichlorostyrene, alpha-methyl styrene, acrylonitrile, methacrylonitrile, methyl methacrylate, methyl vinyl ketone, etc. Representative are copolymers of 1,3-butadiene with styrene and of 1,3-butadiene with acrylonitrile. The sulfurized polymers are effective with many other synthetic elastomers.

In addition it has been found that these new sulfurized low molecular weight linear polymers of the methylpentadiene are effective plasticizers for synthetic resins and other plastics, such as casein and other protein plastics, lignin plastics, cellulose derivatives, synthetic linear polyamides, synthetic linear polyesters, phenol-aldehyde type resins, urea-aldehyde type resins, alkyd resins, resinous polymers of compounds having in the molecule one or more unsaturated carbon-to-carbon linkages, etc.

The sulfurized polymers have many other uses. They have vermicidal action and are effective ingredients in vermifuges such as sheep dips. They may be employed in other biocides such as insect sprays, fungicides, etc. They may be employed as textile assistants, as ingredients in coating compositions, as components of cutting oils, and as chemical intermediates.

Some of the ways in which the invention can be carried out are illustrated by the following examples.

Example I 592 grams of methylpentadiene (approximately 85 parts by weight of 2-methyl-1,3-pentadiene and 15 parts by weight of 4-methyl-1,3-pentadiene) previously flash distilled from a 10% NaOH solution were dissolved in isobutane and placed in a flask fitted with a stirrer and a large reflux condenser. 4.5 grams of $SnCl_4$ in ethyl chloride were then added to the methylpentadiene solution. The rate of addition of the catalyst was such that the heat of polymerization caused the solvent to reflux vigorously. After a period of 3 hours the reaction appeared to be complete and the reaction mixture was diluted with water and washed several times. The solvent was then removed and the polymer which was a cloudy, viscous mass was dried at 100° C. under reduced pressure.

20 grams of sulfur were added portionwise to 151 grams of the above-described low molecular weight linear polymer of methylpentadiene. In an atmosphere of nitrogen the mixture was heated to 160° C. to 175° C. for 18 hours. The reaction mixture was then taken up in isopentane and filtered to remove any uncombined sulfur that might be present. A yield of 168 grams of a dark brown, viscous mass was obtained as the sulfurized polymer. Analyses showed the product to have a 11.67% sulfur content.

2% of the above-produced sulfurized polymer was dissolved in Hydrol and a clean copper strip was added to the solution. The mixture was then heated at 100° C. for 18 hours. After that period of time the copper strip was removed and a thorough examination of the metal failed to reveal any tarnish whatsoever. This experiment clearly indicated that the sulfur was firmly combined in the polymer and that the sulfurized low molecular weight linear polymer could very effectively be used as an additive for lubricating oils.

Example II 570 grams of methylpentadiene (approximately 85 parts by weight of 2-methyl-1,3-pentadiene and 15 parts by weight of 4-methyl-1,3-pentadiene) previously flash distilled from a 10% NaOH solution were dissolved in isopentane (2 liters of isopentane per liter of methylpentadiene) and placed in a flask fitted with a stirrer and a large reflux condenser. 0.5 gram of $BF_3$ in ethyl ether was then added to the methylpentadiene solution. The heat of polymerization resulting from the addition of the catalyst maintained the temperature at around 35° C. After a period of 2 hours the reaction appeared to be complete and the mixture was diluted with water and washed several times. After removal of the solvent 519 grams of a pale yellow, honey-like material was obtained. Infra-red ray analysis of the polymer revealed that it was a linear polymer and molecular weight determinations showed the molecular weight to be around 809.

The pale yellow, honey-like material is then heated with sulfur according to the procedure outlined in Example I to obtain the desired sulfurized polymer.

Example III

In the manner described in Example I, 460 grams of a methylpentadiene previously flash distilled from a 10% NaOH solution were dissolved in isopentane and then treated with 4 grams of $AlCl_3$ in ethyl chloride. After refluxing for an hour the mixture was washed several times and the solvent separated out. 40 grams of a light brown, oily material were obtained as the final product. Infra-red ray analysis revealed that the material was a linear polymer, and its molecular weight was found to be around 1760.

The light brown, oily material is then heated with sulfur according to the procedure outlined in Example I to obtain the desired sulfurized polymer.

Example IV 572 grams of methylpentadiene that had not been previously flash distilled from a 10% NaOH solution were dissolved in isopentane and placed in a flask fitted with a stirrer and a reflux condenser, 1.25 grams of $BF_3$ in ethyl ether were then added to the methylpentadiene solution. The heat of polymerization caused the solvent to reflux vigorously. After a period of 2 hours the reaction appeared to be complete and the reaction mixture was diluted with water and washed several times. After the solvent was removed a yield of 475 grams of a brown, viscous material was obtained. Infra-red ray analysis of the product revealed that it was a linear polymer and its molecular weight was determined as being around 590.

The polymer is then heated with sulfur according to the general procedure described above to obtain the desired sulfurized polymer.

We claim as our invention:

1. A sulfurized low molecular weight linear polymer of 2-methyl-1,3-pentadiene and 4-methyl-1,3-pentadiene.

2. A sulfurized liquid mixture of an unsaturated, low molecular weight linear polymer of 2-methyl-1,3-pentadiene and 4-methyl-1,3-pentadiene.

3. A sulfurized low molecular weight linear polymer of a member of the group consisting of 2-methyl-1,3-pentadiene, 3-methyl-1,3-pentadiene, 4-methyl-1,3-pentadiene, and a mixture of at least two of the foregoing members.

4. A process comprising heating sulfur with a liquid mixture of unsaturated low molecular weight linear polymers of 2-methyl-1,3-pentadiene and 4-methyl-1,3-pentadiene in a substantially inert atmosphere at a temperature between 160° C. and 170° C.

5. A process comprising heating sulfur with a low molecular weight linear polymer of 2-methyl-1,3-pentadiene and 4-methyl-1,3-pentadiene in a substantially inert atmosphere at a temperature between 160° C. and 200° C.

6. A process comprising heating sulfur with a liquid unsaturated low molecular weight linear polymer of a member of the group consisting of 2-methyl-1,3-pentadiene, 3-methyl-1,3-pentadiene, 4-methyl-1,3-pentadiene, and a mixture of at least two of the foregoing members, in a substantially inert atmosphere at a temperature between 160° C. and 170° C.

7. A process comprising heating sulfur with a low molecular weight linear polymer of a member of the group consisting of 2-methyl-1,3-pentadiene, 3-methyl-1,3-pentadiene, 4-methyl-1,3-pentadiene, and a mixture of at least two of the foregoing members, in a substantially inert atmosphere, at a temperature between 160° C. and 200° C.

8. A process comprising heating sulfur with a low molecular weight linear polymer of a member of the group consisting of 2-methyl-1,3-pentadiene, 3-methyl-1,3-pentadiene, 4-methyl-1,3-pentadiene, and a mixture of at least two of the foregoing members, in a substantially inert atmosphere at a temperature below that at which any substantial amount of hydrogen sulfide is formed.

RUPERT C. MORRIS.
JOHN L. VAN WINKLE.

REFERENCES CITED

The following references are of record in the file of this patent:

UNITED STATES PATENTS

| Number | Name | Date |
| --- | --- | --- |
| 2,093,752 | Duecker et al. | Sept. 21, 1937 |
| 2,225,573 | Tendeloo | Dec. 17, 1940 |
| 2,337,473 | Knowles et al. | Dec. 21, 1943 |
| 2,338,829 | Werntz | Jan. 11, 1944 |
| 2,402,456 | Signaigo | June 18, 1946 |
| 2,422,275 | Winning | June 17, 1947 |